Feb. 15, 1966 P. P. NEWCOMB 3,235,205
MEANS AND METHOD OF ASSEMBLY OF A NUCLEAR AIRCRAFT ENGINE
Filed Oct. 2, 1957 4 Sheets-Sheet 1

INVENTOR
PHILIP P. NEWCOMB
BY
ATTORNEY

Feb. 15, 1966  P. P. NEWCOMB  3,235,205
MEANS AND METHOD OF ASSEMBLY OF A NUCLEAR AIRCRAFT ENGINE
Filed Oct. 2, 1957  4 Sheets-Sheet 2

INVENTOR
PHILIP P. NEWCOMB
BY *M. B. Tasker*
ATTORNEY

Feb. 15, 1966  P. P. NEWCOMB  3,235,205
MEANS AND METHOD OF ASSEMBLY OF A NUCLEAR AIRCRAFT ENGINE
Filed Oct. 2, 1957  4 Sheets-Sheet 3

INVENTOR
PHILIP P. NEWCOMB
BY M. B. Tasker
ATTORNEY

Feb. 15, 1966 P. P. NEWCOMB 3,235,205
MEANS AND METHOD OF ASSEMBLY OF A NUCLEAR AIRCRAFT ENGINE
Filed Oct. 2, 1957 4 Sheets-Sheet 4

INVENTOR
PHILIP P. NEWCOMB
BY M. B. Tasker
ATTORNEY

United States Patent Office 3,235,205
Patented Feb. 15, 1966

3,235,205
MEANS AND METHOD OF ASSEMBLY OF A NUCLEAR AIRCRAFT ENGINE
Philip P. Newcomb, 151 Pitkin St., Manchester, Conn.
Filed Oct. 2, 1957, Ser. No. 687,837
10 Claims. (Cl. 244—54)

This invention relates to nuclear-powered aircraft and particularly to aircraft in which a gas-turbine engine obtains heat from a reactor by means including a radiator located within the engine casing between the engine compressor discharge and the engine turbine inlet.

Certain components of the engine must be removed from the airplane periodically for ground maintenance, such for example, as the compressor, the turbine, and the engine shaft and its bearings. If the engine is designed to burn chemical fuel in addition to the heat it derives from the reactor, the flame tubes must also be readily removable. It has been the practice to remove the engine as a unit for these periodic overhauls, but the presence of the radiator in the engine casing raises some difficult problems.

The radiator with its contents, in the first place, is heavy. Also, it is connected with the reactor by conduits of considerable size and the radiator with its conduits contain the heat-transfer medium which is radioactive and cannot be readily drawn off. Further, the conduits are formed with welded joints and are welded to the radiator. Any connection other than a welded connection becomes welded due to the high temperature of the heat-transfer medium which circulates through the radiator.

It is an object of this invention to provide a nuclear gas-turbine engine-driven aircraft in which the major mounts which support the engine on the airframe are located on the radiator section and in which the engine turbine section, the engine compressor section, the engine shaft and its bearings, and such components as the flame tubes and diffuser sections, may be removed from the radiator section, allowing the latter with its fluid connections to the reactor to become a relatively permanent part of the aircraft structure.

A further object of the invention is generally to improve nuclear-powered airplanes and their gas turbine power plants.

These and other objects and advantages of the invention will be evident or will be specifically pointed out in the following detailed description of the drawings which illustrate one embodiment of the invention. In these drawings.

Figure 1:
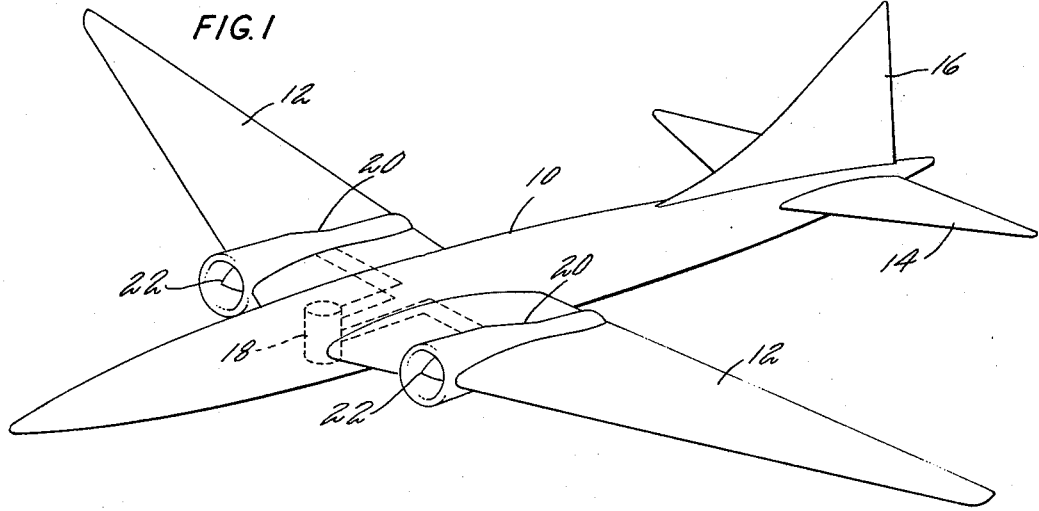
FIG. 1 is a perspective view of a nuclear-powered airplane embodying the invention.
Figure 2:
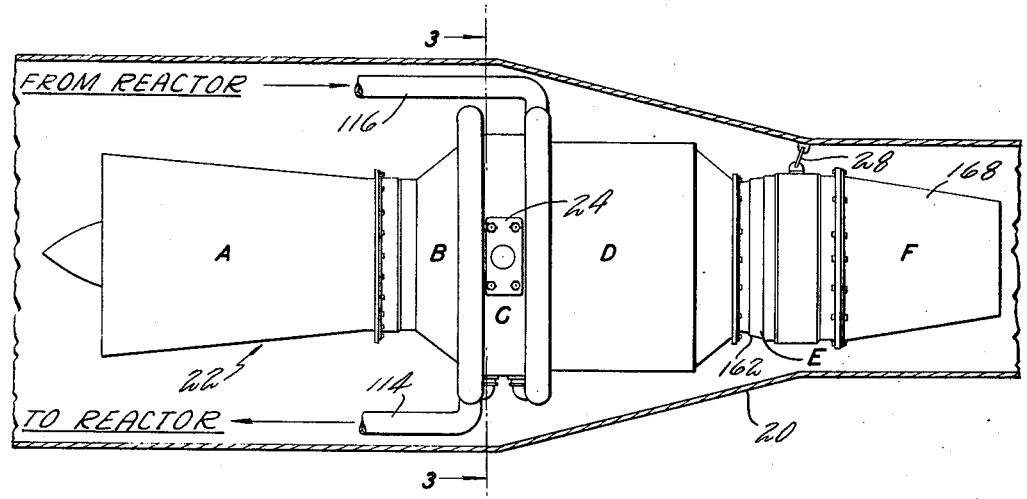
FIG. 2 is a view of one of the engines.
Figure 3:
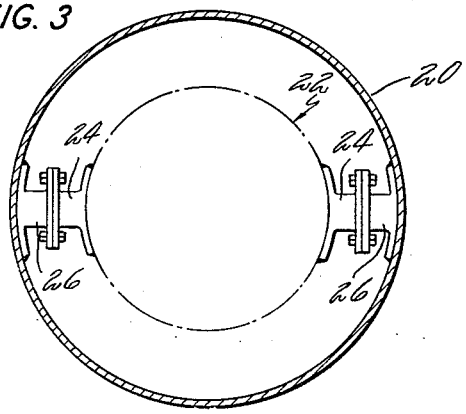
FIG. 3 is a transverse view through an engine pod showing the main engine mounts.
Figure 4:
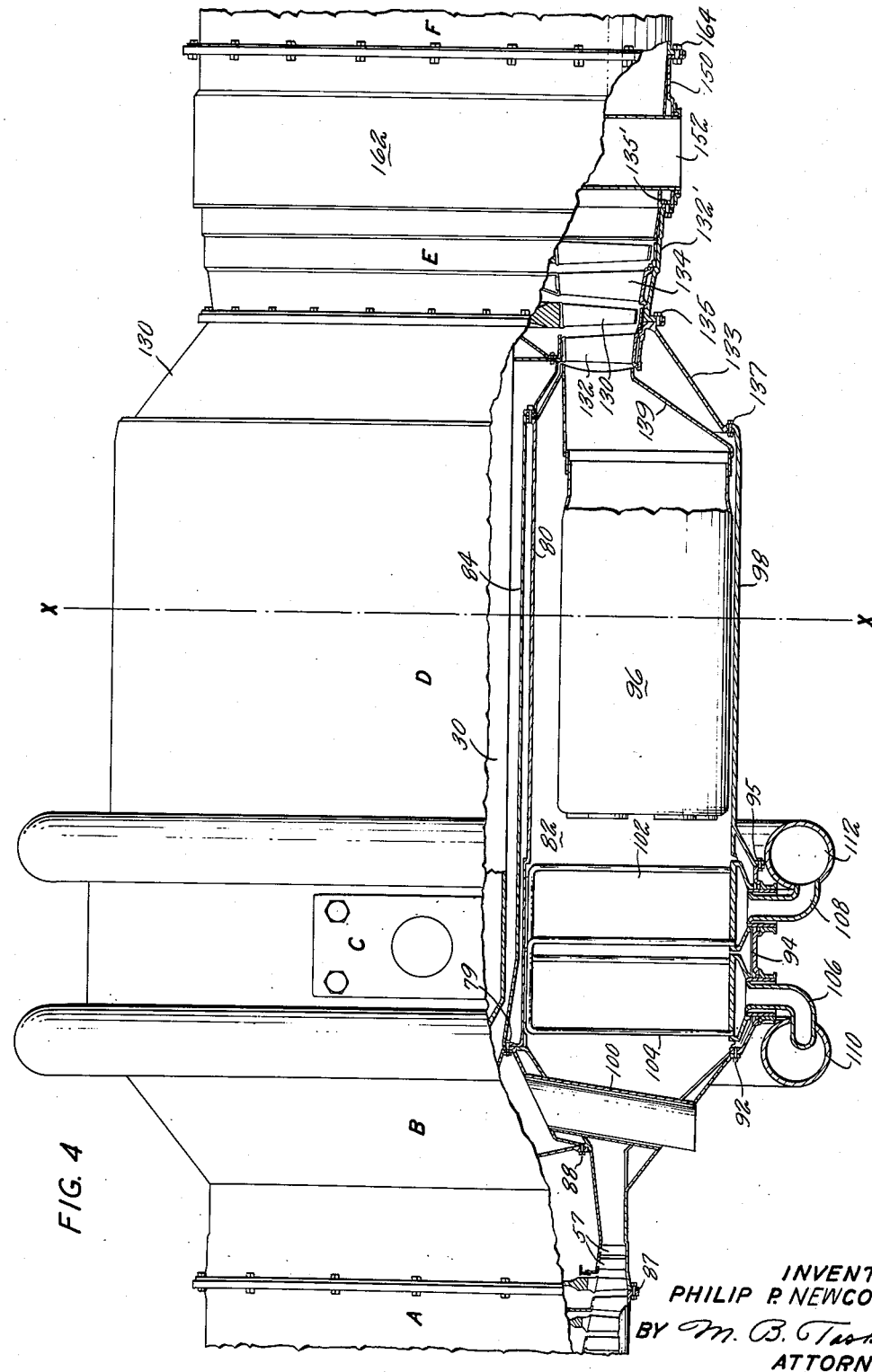
FIG. 4 is an enlarged view of an engine, partly in section.

FIG. 1 shows a nuclear-powered airplane having a fuselage 10, wings 12, and horizontal and vertical control surfaces 14 and 16. A nuclear reactor 18 is located in the fuselage in the vicinity of the wings and engine pods 20 are carried by the inboard portion of the wings in each of which a gas-turbine engine 22 is mounted. As shown in FIGS. 2 and 3, engine-mounting brackets 24 and 26 carried by the engine and the pods respectively, are located at the opposite sides of the engines. These brackets are detachably connected by bolts and take the fore and aft and lateral loads as well as the vertical load. A trailing link support 28 is also provided which takes vertical loads only.

Each engine (FIG. 2) consists essentially of a compressor section A, a diffuser section B, a heat-transfer section C, a combustor section D, a turbine section E and an afterburner section F, each of which is enclosed in an outer casing section. The casing sections are connected together in a manner to be described in detail hereinafter to form the outer structural casing of the engine.

Figure 5:
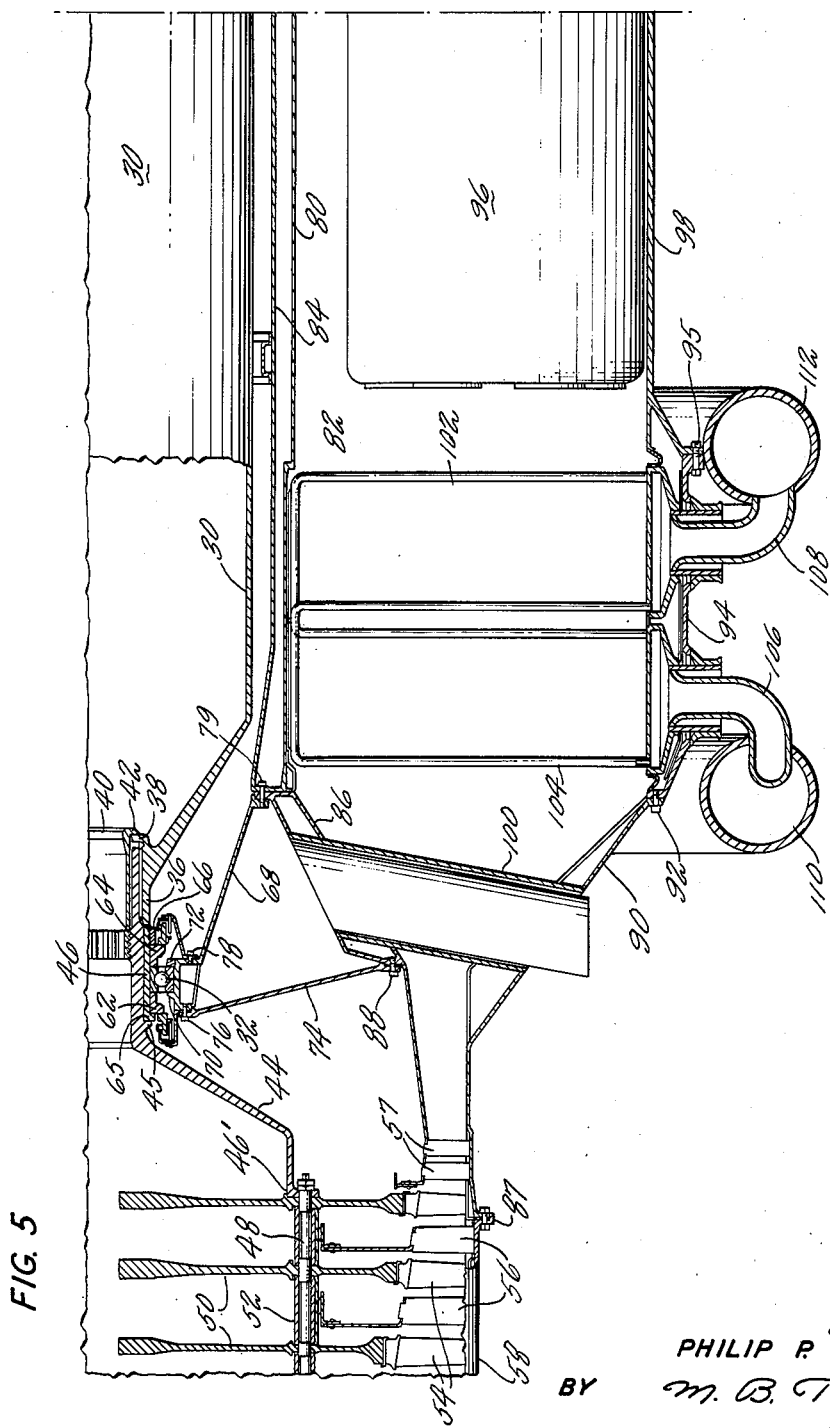
FIGS. 5 and 6 show left and right hand portions, respectively, of the engine of FIG. 4 on an enlarged scale, the dividing line being along line X—X of FIG. 4.
Figure 6:
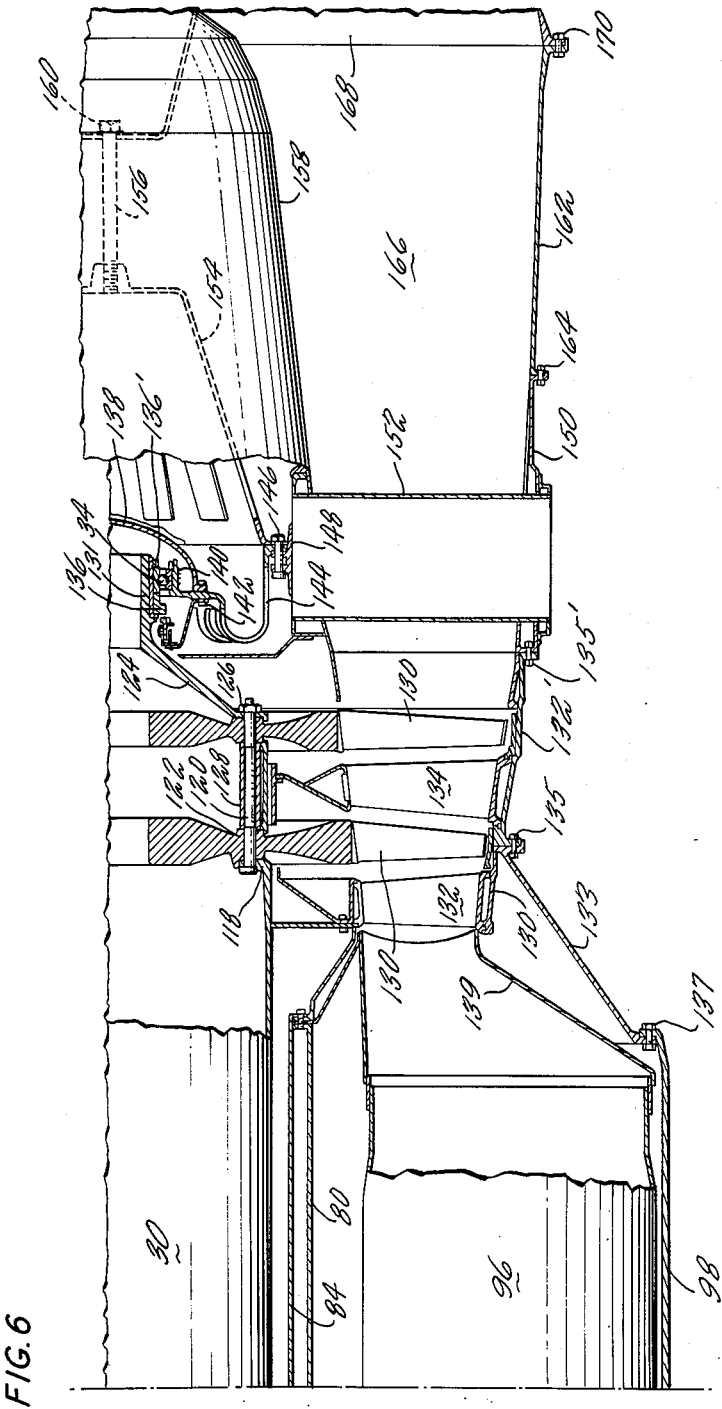

The engine illustrated is of the axial-flow type having a hollow axial shaft 30 supported in a forward bearing 32 (FIG. 5), and an aft bearing 34 (FIG. 6). Shaft 30 has a forward cylindrical end portion 36 having an inwardly directed flange 38. An internally splined nut 40 having an outwardly directed flange 42 engaging the aft side of flange 38 has its forward end externally threaded to cooperate with internal threads on compressor end bell 44. As unit 42 is tightened, a shoulder 45 on end bell 44 abuts a sleeve 46 which in turn abuts the forward end of cylindrical portion 36 on shaft 30 so that end bell 44 becomes a rigid extension of shaft 30. The forward end of end bell 44 has an outturned annular flange 46' in which an annular series of holes are provided to receive bolts 48 on which compressor discs 50 are supported, spacer sleeves 52 being provided on the bolts between adjacent discs. The compressor discs carry the usual blades 54 which alternate with stator vanes 56 carried by the compressor outer casing 58.

The inner race of forward bearing 32 is centrally positioned on sleeve 46 between a forward positioning ring 62 which abuts flange 65 on sleeve 46 and an aft positioning ring 64 which is held in place on said sleeve by a nut 66. The outer race of bearing 32 is carried by an annular bearing-supporting ring 68 between a flange 70 and a threaded nut 72. A second angularly related bearing support ring 74 is connected by bolts 76 to the inboard end of bearing support ring 68. The usual seals for the bearing are supported on the bearing support rings 74 and 68 by bolts 76 and 78. The outer end of the annular bearing support ring 68 is connected by means of bolts 79 to the inner wall 80 of an annular combustion chamber 82, an annular heat shield 84 located between the inner wall 80 and the shaft 30 also being secured at its forward end by bolts 79. Bearing support ring 74 is secured at its outer end to an inner annular diffuser wall 86 by bolts 88. The outer annular diffuser wall 90 is secured by bolts 92 to the outer casing wall 94 of the heat-transfer section C, which in turn is connected by bolts 95 to the outer annular wall 98 of the combustion chamber 82. The usual radial hollow struts 100 are provided in the diffuser walls through which the lubricating lines for the bearing may extend. Flame tubes 96 are provided around the annular combustion chamber 82, one of which is shown in FIG. 5, just aft of a radiator 102, which is generally rectangular in section and extends around the annular chamber formed by a forward extension of the inner combustion chamber wall 80 and the outer casing 94 of the radiator section.

The matrix of radiator 102 consists of a plurality of circulating pipes 104 which are suitably connected through inlet and outlet header adapters 106 and 108 to inlet header 110 and outlet header 112, which extend around the radiator externally of the outer casing wall 94 and are connected to the reactor through inlet conduit 114 and outlet conduit 116 (FIG. 2). The radiator is of the usual cross-flow type in which air from the compressor passes axially through the annular matrix into combustion chamber 82 where it is further heated by fuel burned in the flame tubes 96.

At its aft end the tubular shaft 30 carries an inturned flange 118 (FIG. 6), for supporting an annular series of bolts 120, which support the turbine discs 122. Bolts 120 also extend through the turbine end bell 124, nuts 126 being provided on the bolts 120 for rigidly connecting the end bell to shaft 30, the usual spacer sleeves 128 being provided between the turbine discs. The turbine discs carry the usual turbine blades 130 between which the first and second stage nozzle vanes 132 and 134 are located in the usual manner. These nozzle vanes are supported from the outer annular casing sections 130 and 132', which are connected by a series of bolts 135. Bolts 135 also extend through the aft end of outer casing section 133 which encloses the transition members 139 between the flame tubes and the turbine inlet.

The aft main bearing 34 is mounted on cylindrical extension 131 of end bell 124 by means of spacer sleeve 136 and a nut 136'. The usual end cap 138 is provided to enclose the bearing. The cap is secured to an annular bearing support 140 by means of bolts 142, which also extend through an annular resilient support 144. Annular support 144 has a flange which is connected by bolts 146 to the inner casing ring 148. Inner casing ring 148 is connected to the outer casing ring 150 by a series of hollow radial struts 152. The bolts 146 also secure an annular slotted cone member 154 which has an axial stud 156 projecting aft thereof on which the cone 158 is secured by a nut 160 threaded on stud 156. An outer exhaust duct casing 162 is connected by bolts 164 with the outer casing ring 150 to form the annular exhaust duct 166. An afterburner 168 may be provided, if desired, which is connected to the aft end of casing 162 by an annular series of bolts 170.

When it is desired to service the engine, the afterburner 168 is first removed from the exhaust duct casing 162 by removing bolts 170. This affords access to the recessed end of cone 158, permitting the removal of nut 160 and the outer cone 158. The inner conical member 154 is next removed by the removal of bolts 146, which permits the removal of bolts 142 and end cap 138.

With the removal of cap 138, the aft bearing 34 can be easily removed upon removal of nut 136' for service. Also, the hollow axial shaft 30 is now exposed at its aft end and, by reaching through this shaft with a splined rod, nut 40 (FIG. 5) can be removed. By removing bolts 135, shaft 30, end bell 124, turbine discs 122, and the housing assembly can all be drawn aft.

By removing bolts 137 and 96a, the outer casing can be removed and flame tubes 96 can be withdrawn from the combustion chamber.

As previously mentioned, upon the removal of nut 40 and shaft 30, the compressor assembly (FIG. 5) can be withdrawn forwardly.

It will be evident that as a result of this invention a nuclear gas-turbine engine-powered aircraft has been provided in which the engines are mounted on the aircraft in such a manner that those parts of the engines which are connected with the reactor are a relatively permanent part of the fixed aircraft structure and support the engines on the airframe, and in which those parts of the engines which must be inspected frequently are readily removable without removing each engine bodily as a unit as in the present practice.

It will further be evident that a nuclear-powered aircraft has been provided in which those parts of the engine which may be radioactive carry the engine mounts and remain a part of the aircraft while the turbine and compressor sections, the bearings, and other parts requiring servicing, are readily removable.

While only one embodiment of the invention has been shown and described herein, it will be understood that various changes may be made in the construction and arrangement of the parts without departing from the scope of the invention.

I claim:

1. In an aircraft, a gas-turbine engine comprising a forward compressor section, an intermediate radiator section and an aft turbine section, means carried by said radiator section for supporting said engine on fixed structure of said aircraft, inlet and outlet header structure carried by said radiator section and adjacent fixed structure of said aircraft, said engine having an outer casing structure enclosing said radiator section, an outer casing structure enclosing said compressor section, an outer casing structure enclosing said turbine section, a tubular shaft extended axially through said radiator section and into said compressor and turbine sections, a turbine rotor carried by one end of said shaft, a compressor rotor carried by the other end of said shaft, bearings carried by said enclosing structures for supporting said shaft, means for detachably securing said compressor and turbine casings to said radiator casing, and means accessible through said tubular shaft from said turbine section for detachably connecting said other end of said shaft to said compressor rotor.

2. In an airplane, a fuselage, wings carried by said fuselage, engine nacelles carried by said wings, a gas-turbine engine in each nacelle comprising a forward compressor section, an intermediate radiator section and an aft turbine section, means for supporting said engines in said nacelles including engine mounts on said radiator sections, fluid-circulating means carried by said airplane and connected with said radiator section for transferring heat to said engines, and means accessible from outside its nacelle for detachably supporting said compressor and turbine sections of each engine on its radiator section, whereby the fore and aft sections of the engine can be removed from said nacelle for servicing while said radiator section and said fluid-circulating means remains connected to airplane structure.

3. In an aircraft, an axial-flow gas-turbine engine comprising a compressor section having an outer casing, a turbine section having an outer casing and an intermediate radiator section having an outer casing, means for securing said casings together, a hollow shaft extended axially through said casings, fore and aft bearings supported from said casing sections for supporting said shaft, a compressor rotor carried by one end of said shaft, a turbine rotor carried by the other end of said shaft, means for supporting said engine on said airplane including engine mounts carried by said radiator section, and means for removably supporting said turbine and compressor sections relative to said radiator section including means accessible through said shaft for detachably connecting said shaft to said compressor rotor.

4. An aircraft having a fuselage and wings, an engine pod carried by each wing, a gas-turbine engine in each pod, each engine comprising an intermediate radiator section having an axial passage and an enclosing casing, means for supporting said radiator on fixed aircraft structure including engine mounts carried by said radiator casing, a turbine on one side of said radiator having an enclosing casing, a compressor on the other side of said radiator having an enclosing casing, means accessible from outside said engine for detachably connecting said turbine and compressor casings to said radiator casing, said turbine and said compressor both having rotating elements, a hollow engine shaft extended through the passage in the axis of said radiator, means for connecting said shaft to one of said rotating elements, and a nut accessible through said shaft from outside said engine pod for releasably connecting said shaft to the other of said elements.

5. A gas-turbine engine-driven aircraft having a fuselage, an engine pod carried by said aircraft, a gas-turbine engine in said pod comprising a radiator section having an axial passage and an enclosing casing, means for supporting said engine on said aircraft including cooperating engine mounts on said radiator casing and on said pod, a turbine on one side of said radiator having a casing, a compressor on the other side of said radiator having a casing, said turbine and compressor having rotatable elements within said casings, a tubular engine shaft extended through said axial passage of said radiator and connected to said rotary elements of said turbine and compressor, means for removing the rotary element of said turbine and said shaft as a unit from one end of said engine and for removing said rotary element of said compressor from the other end of said engine including a nut connected to and rotatable in said hollow shaft having a threaded connection with said rotary element of said compressor and operable from outside said pod through said hollow shaft.

6. A gas-turbine engine-driven airplane having a fuselage and wings, engine pods carried by said wings, a gas-turbine engine in each of said pods, each of said engines comprising a radiator section having an enclosing casing, means for supporting said radiator casing on fixed aircraft structure, a turbine section having an enclosing casing, means for detachably connecting said turbine casing to said radiator casing, said turbine having rotary elements including an end bell, a tubular shaft extended through said radiator, means for connecting said shaft to said turbine end bell, a compressor at the other side of said radiator from said turbine having an end bell, said compressor having an outer casing, means for releasably connecting said compressor casing to said radiator casing, and a nut connected to said hollow shaft and within said shaft having a threaded connection with said compressor end bell for releasably connecting the rotary elements of said compressor to said shaft.

7. In a nuclear-powered airplane, a fuselage having wings, a nuclear reactor in said fuselage, engine nacelles carried by said wings, a gas-turbine engine in each of said nacelles, each of said engines comprising a forward compressor section, an intermediate radiator section and an aft turbine section, means for supporting said engines in said nacelles comprising cooperating engine-mounting brackets carried by said nacelles and by said engine radiator sections, and fluid-circulating means carried by said airplane and connected with the radiators of said intermediate sections and with said reactor for transferring heat from said reactor to said radiators including radiator inlet and outlet header means surrounding said radiators, said engine radiator sections together with said headers and their connections to said reactor being supported in said engine nacelles by said brackets, each engine having means for detachably supporting its compressor and turbine section on its radiator section for ready removal from its nacelle for servicing while its radiator section and its fluid connections to said reactor remain undisturbed in said nacelle.

8. In an aircraft having a fuselage and wings supported on said fuselage, engine-enclosing nacelles carried by said wings, an axial-flow gas-turbine engine mounted within each of said nacelles comprising a forward compressor section, an aft turbine section and an intermediate radiator section, means for supporting the radiator section of each engine on fixed structure of the aircraft, and means accessible from outside of said nacelles for detachably supporting the compressor and turbine sections of each engine on its radiator section for ready removal from its nacelle for servicing while its radiator section remains fixed to the aircraft.

9. In an aircraft having a fuselage and wings supported on said fuselage, engine-enclosing nacelles carried by said wings, an axial-flow gas-turbine engine mounted within each nacelle comprising a forward compressor section, an aft turbine section and an intermediate radiator section, means for supporting said engines on fixed aircraft structure including engine mounts carried by said radiator sections, each engine having a shaft extended through its radiator section, a compressor rotor carried by said shaft in said compressor section, a turbine rotor carried by said shaft in said turbine section, and means accessible from outside said nacelle for detachably supporting said compressor and turbine rotors and said shaft on said radiator section.

10. In an aircraft having a fuselage and wings supported on said fuselage, engine-enclosing nacelles carried by said wings, an axial-flow gas-turbine engine mounted within each nacelle comprising a forward compressor section, an aft turbine section and an intermediate radiator section, each of said sections having an outer casing, means for connecting said casings to form an outer housing for said engine, means for supporting said engine in said aircraft including cooperating engine mounts carried by said radiator casing and said nacelle, a hollow shaft extended axially through said radiator section, a compressor rotor carried by said shaft in said compressor section, a turbine rotor carried by said shaft in said turbine section, and means accessible through said hollow shaft while said engine is within its nacelle for removably supporting said shaft and turbine rotor for withdrawal through said turbine casing and for supporting said compressor rotor for withdrawal through said compressor casing.

References Cited by the Examiner

UNITED STATES PATENTS

| 2,640,317 | 6/1953 | Fentress | 60—39.31 |
| 2,646,209 | 7/1953 | Galliot | 60—39.51 |
| 2,678,532 | 5/1954 | Miller | 60—39.51 |
| 2,680,346 | 6/1954 | Michael. | |
| 2,686,401 | 8/1954 | Newcomb | 60—39.31 |
| 2,803,944 | 8/1957 | Kroon | 60—35.54 |
| 2,922,278 | 1/1960 | Szydlowski | 60—35.6 |

FOREIGN PATENTS

| 1,137,047 | 1/1957 | France. |
| 754,559 | 8/1956 | Great Britain. |

OTHER REFERENCES

SAE Journal: January 1949; Atomic Powered Plane; by Andrew Kalitinsky; pages 44–47.

Nucleonics: June 1957; "Fused-Salt Reactor Test" and "Direct Cycle Takes Lead for Nuclear Plane Engine," pages 20–22.

MILTON BUCHLER, *Primary Examiner.*

SAMUEL BOYD, ARTHUR M. HORTON, *Examiners.*

R. W. ERICKSON, W. J. CURRAN, R. F. STAHL, L. C. HALL, *Assistant Examiners.*